(12) United States Patent
Beard et al.

(10) Patent No.: US 12,447,501 B2
(45) Date of Patent: Oct. 21, 2025

(54) METHODS AND APPARATUSES FOR FABRICATING POLYMERIC CONFORMAL COATINGS, PARTS COATED WITH POLYMERIC CONFORMAL COATINGS, AND OPTICAL APPARATUS INCLUDING SAID PARTS

(71) Applicant: UCL BUSINESS LTD, London (GB)

(72) Inventors: Paul Beard, London (GB); Edward Zhang, London (GB); James Guggenheim, London (GB)

(73) Assignee: UCL BUSINESS LTD, London (GB)

( * ) Notice: Subject to any disclaimer, the term of this patent is extended or adjusted under 35 U.S.C. 154(b) by 433 days.

(21) Appl. No.: 17/641,789

(22) PCT Filed: Sep. 7, 2020

(86) PCT No.: PCT/GB2020/052147
§ 371 (c)(1),
(2) Date: Mar. 9, 2022

(87) PCT Pub. No.: WO2021/048529
PCT Pub. Date: Mar. 18, 2021

(65) Prior Publication Data
US 2022/0395858 A1 Dec. 15, 2022

(30) Foreign Application Priority Data

Sep. 12, 2019 (GB) ..................... 1913140

(51) Int. Cl.
*B05D 1/00* (2006.01)
*B05D 1/32* (2006.01)
(Continued)

(52) U.S. Cl.
CPC ............ *B05D 1/60* (2013.01); *B05D 1/32* (2013.01); *C23C 16/042* (2013.01); *G01H 9/002* (2013.01)

(58) Field of Classification Search
CPC ............ B05D 1/60; B05D 1/32; C23C 16/042
See application file for complete search history.

(56) References Cited

U.S. PATENT DOCUMENTS 6,753,255 B1    6/2004 Takada et al.
6,813,401 B1*  11/2004 Mills .................. G01B 9/02023
                                                              385/12
(Continued)

FOREIGN PATENT DOCUMENTS

JP      9-92623         4/1997
WO      99/22043 A1     5/1999
(Continued)

OTHER PUBLICATIONS

Zhang, Edward et al., "Backward-mode multiwavelength photoacoustic scanner using a planar Fabry-Perot polymer film ultrasound sensor for high-resolution three-dimensional imaging of biological tissues", Applied Optics, 47(4):561 (Feb. 1, 2008).
(Continued)

*Primary Examiner* — Kelly M Gambetta
(74) *Attorney, Agent, or Firm* — FULLER IP LAW LLC; Rodney J. Fuller

(57) ABSTRACT

A method of forming a vapour deposited polymeric conformal coating on a surface of a part (23). The method comprises placing the part (23) and a flow control screen in a deposition chamber (22); dispersing a gas into the chamber (22) from which the polymeric coating is deposited on the surface. The flow control screen is spaced apart from the surface and is configured to control a localised flow of the gas in the chamber so as to impose a structure on the deposited coating.

11 Claims, 7 Drawing Sheets

(51) Int. Cl.
   *C23C 16/04* (2006.01)
   *G01H 9/00* (2006.01)

(56) References Cited

U.S. PATENT DOCUMENTS

| | | |
|---|---|---|
| 2011/0081504 A1 | 4/2011 | Gersdorff |
| 2011/0293832 A1* | 12/2011 | Gersdorff ................. B05D 1/60 |
| | | 118/724 |
| 2018/0209030 A1* | 7/2018 | Khayrullin ........... H10K 71/166 |

FOREIGN PATENT DOCUMENTS

| | | |
|---|---|---|
| WO | 99/52647 A1 | 10/1999 |
| WO | 01/14824 A1 | 3/2001 |
| WO | 03/032024 A2 | 4/2003 |
| WO | 2019/145738 A1 | 8/2019 |

OTHER PUBLICATIONS

Search Report Under Section 17(5) for Application No. GB1913140.8 dated Mar. 11, 2020 (4 pages).
International Search Report for PCT/GB2020/052147 dated Nov. 20, 2020 (5 pages).
Written Opinion of the International Searching Authority for PCT/GB2020/052147 dated Nov. 20, 2020 (13 pages).

\* cited by examiner

METHODS AND APPARATUSES FOR FABRICATING POLYMERIC CONFORMAL COATINGS, PARTS COATED WITH POLYMERIC CONFORMAL COATINGS, AND OPTICAL APPARATUS INCLUDING SAID PARTS

CROSS-REFERENCE TO RELATED APPLICATIONS

This application is the U.S. National Stage of International Application No. PCT/GB2020/052147, filed Sep. 7, 2020, which claims the benefit of and priority to Great Britain Application No. 1913140.8, filed Sep. 12, 2019, the contents of each of which are herein expressly incorporated by reference for all purposes in their entireties.

TECHNICAL FIELD

The present disclosure relates generally to methods and apparatuses for fabricating polymeric conformal coatings, and parts coated with polymeric conformal coatings. The present disclosure also relates to forming coated parts for use as Fabry Perot interferometers for use, for example, in an optical ultrasound readout system, and for forming coating parts having other microscale coating structures including microlenses for example, on optical fibres.

BACKGROUND

Methods of coating parts with polymeric conformal coatings, such as Parylene, have been in widespread use primarily for encapsulation of the parts for their protection and to act as a barrier from the environment, often for medical and electronics applications.

Polymeric conformal coatings can be formed, for example, by the condensation of a monomer gas onto a surface of a part to be coated, typically at ambient temperatures and low pressures (near vacuum of around 10-20 Pa), in a deposition chamber. On condensation, the monomer simultaneously adsorbs into the surface and polymerises into long polymer chains to grow a conformal polymer coating layer on the surface. The monomer gas is typically created by providing a vaporised dimer precursor into a pyrolysis chamber where it is heated at pressure to create the monomer gas which is then dispersed into the evacuated deposition chamber, whereupon the polymer coating of all surfaces within the chamber commences. The polymer coating typically progresses at uniform growth rates and so the growth of the coating can be selectably controlled to a desired thickness.

Polymeric coatings have a wide range of applications. In an number of these applications, a planar polymer layer may be desirable, for example with minimal thickness variation. An example of a use of a Parylene coating is in the provision of an interferometric cavity of a Fabry Perot interferometer. Here, by forming a Parylene coating on an optically reflective surface of a substrate, and by forming a further optically reflective surface on the facing surface of the deposited Parylene layer, a Fabry Perot interferometer or etalon can be formed with the Parylene layer providing the interferometeric cavity between two reflective surfaces.

A polymer film interferometer such as this has a use in developing apparatus to deliver optical ultrasound sensing and imaging for medical imaging, non-destructive testing, and other applications. The fabricated Fabry Perot cavities can be used to sense other measurands, such as temperature, quasi-static pressure, etc.

In one optical ultrasound approach, a polymer film interferometer provides an optical component that exhibits narrowband reflection of incident light in the cavity by a reflected power responsive to whether the phase of multiple light reflections in the cavity is such that the reflected light beams interfere constructively or destructively. By placing an acoustically sensitive surface of the polymer film interferometer in contact with a medium having an acoustic (ultrasound) field, the compression and deflection of the polymer film cavity modulates the phase difference of the light in the cavity and in doing so modulates the power of the reflected interrogation signal by an amount. In this way, the interferometer has a transfer function responsive to an acoustic field applied to it and so it can be used as a sensor to transduce the acoustic field signal.

Thus for optical ultrasound imaging, the incident acoustic field can be interrogated by illuminating the etalon with a laser and monitoring the variation of the reflected optical power at locations across the surface of the etalon. The acoustic field can thus be recovered from the modulated interrogation light signal, allowing, where it is sensed at multiple points, an image of the target tissue to be constructed, for example, using tomographic techniques.

As the reflected optical power, and the magnitude of the variation of the reflected optical power due to an incident acoustic field, vary with the phase difference of the reflected optical fields in the interferometer cavity, the sensitivity of the interferometer to an incident acoustic wave can vary significantly across with polymer film interferometer with even sub-micron variations in cavity thickness across the surface.

In some contexts, a structured polymer layer may be useful, for example, with a desired thickness variation, or with a pattern imposed, rather than a blanket layer having uniform thickness. It is in this context that the presently disclosed subject matter has been devised.

BRIEF SUMMARY OF THE DISCLOSURE

According to a first aspect, a method of forming a vapour deposited polymeric conformal coating on a surface of a part is provided, comprising; placing the part and a flow control screen in a deposition chamber; dispersing a gas into the chamber from which the polymeric coating is deposited on the surface; wherein the flow control screen is spaced apart from the surface and is configured to control a localised flow of the gas in the chamber so as to impose a structure on the deposited coating.

In some embodiments, the vapour deposition process may be a Chemical Vapour Deposition process, in which the gas comprises monomer particles that condense and polymerise at the surface to form the polymeric coating. In other embodiments, the vapour deposition process may be a Physical Vapour Deposition process in which a gas a polymer particles is condensed at the surface to form the polymeric coating. For example, a polymer may be dissolved in a solvent and then frozen to form a target. The target may subsequently be vaporised (e.g. using a laser) to provide a gas of polymer particles that disperses in the chamber to deposit a polymer layer on the surface.

In the deposition chamber, the gas freely disperses to condense and adsorb (and optionally, polymerise) on surfaces with which they interact. While the coating growth rate is nominally uniform, uncontrolled variations in the coating growth rate may arise. These uncontrolled variations resulting from the flow of the gas throughout the chamber, the chamber geometry, the rotation of the part if on any turntable or tumbler, the geometry of any stage, rack or mounting surface acting as a support for the part and its interaction with the chamber geometry, developing diffusion of the gas pursuant to deposition, and thermal effects.

In some applications the polymer coating may be required to have a particular shape configuration on microscale dimensions. For example, a curved surface may be used to focus light in an optical device (and may also be useful in an acoustic context). A pattern imposed on the polymer layer may be used to provide a plurality (e.g. an array) of curved elements. Each element may have similar curvature, and may be convex or concave. Each curved element may have a diameter of between 50 microns and 500 microns, optionally up to 1 mm. A reference to thickness variation in this specification may mean at the level of each element in an array (rather than across an array of elements).

The present inventors have realised that the polymer deposition process can be controlled to provide a polymeric coating layer having a desired structure or pattern by placing in the deposition chamber a flow control screen spaced apart from the surface of the part to be coated. Configuring the flow control screen (or flow control screens) spaced apart from the surface (or surfaces) of a part to be coated may control the flow of the gas particles around the part during deposition and ongoing dispersion, thereby polymeric coating can be promoted to be deposited on the one or more coating surfaces imposing a structure on the deposited coating (e.g. a pattern or a controlled thickness variation, or a pattern of elements, each element have a controlled thickness variation, such as a convex outer surface).

A suitable flow control screen may comprise a mesh. It has been found that by configuring and arranging the flow control screen spaced apart from the surface, structures of polymer conformal coatings can be obtained that are shaped to perform a particular function. For example, a Fabry Perot polymer film interferometer can be formed having an array of plano-convex structures to improve reflected signal intensity. Further, concave and convex microlenses can be formed on a flat substrate in a polymer conformal coating process. Further still, microlenses may be formed on the ends of cleaved optical fibres or fibre optic bundles. These examples are non-limiting.

Thus in accordance with this aspect, the present disclosure provides a means to control polymer coating growth to create desired shape configurations on microscale dimensions, for example, to provide a polymer layer or layer features to perform a particular function.

In embodiments, the surface to be coated is a first reflective surface of a part that is, when finished, to provide a Fabry Perot interferometer, wherein the polymeric coating is to provide an optical cavity of the Fabry Perot interferometer.

In embodiments, the method further comprises depositing one or more layers on the surface of the deposited polymeric coating to provide a second reflective surface in opposition to the first reflective surface, to thereby form the Fabry Perot interferometer.

In embodiments, the flow control screen may comprise a mesh grid spaced apart from the surface to be coated.

In embodiments, a surface supporting the part to be coated may have substantially the same diameter the flow control screen.

In embodiments, the flow control screen comprises a mesh grid arranged proximal to the surface of the part to be coated, optionally spaced less than 5 mm therefrom or less than three times the diameter of the mesh hole size, so as to create a patterning of the thickness of the polymeric coating.

In embodiments, the patterning of the thickness of the polymeric coating creates an array of plano-convex structures, and wherein the finished part provides an array of localised Fabry Perot interferometric structures, with each plano-convex structure providing an optical cavity of a localised Fabry Perot interferometric structure.

In embodiments, the polymeric coating is sandwiched between two reflective surfaces.

In this way, a polymer film interferometer can be produced having a shape configuration on microscale dimensions that can increase the finesse, or the reflected signal power or the sensitivity of the interferometer.

The flow control screen (or screens) may be placed adjacent a surface of the part to be coated. In embodiments, the one or more flow control screens may be provided on, around or closely facing, optionally spaced by at most 2 mm or at most three times the size of a feature of the flow control screen that is to impose a shape configuration of a coating feature on the coating, the surface of the part to be coated to reduce polymeric deposition on the flow control screened surfaces of the part and to impose a shape configuration of a coating feature on the coating.

Is it to be understood that a surface covering that only serves to prevent deposition on covered regions of a surface and that is not configured to control flow in any way so as to achieve a desired shape configuration of the deposited coating layer to impose a structure or features on the shape of the polymeric coating, is not to be considered a deposition regulation structure or a flow control screen in the sense of the present disclosure.

In embodiments, the flow control screen is patterned to produce in the coating layer deposited on the part one or more microlens structures, optionally concave or convex.

Thus, the methods disclosed herein can be used to impose a desired pattern or structure on the shape configuration of the polymer conformal coating at a microscale level. This can be achieved, for example, by using flow control screens patterned with openings or shaped appropriately. Generally, these methods can be used to impose desired pattern or structure on the shape configuration of the polymer conformal coating measurable, by an appropriate measuring technique, at variations in the thickness of the coating down to tenths or hundredths of a micron on a polymer conformal coating having a thickness on the order of microns to tens or even hundreds of microns.

These sub-micron level patterns can be achieved by a flow control screen facing the coating surface but spaced sufficiently far away from the surface to impose a shape configuration of a coating feature on the coating at a sufficiently low level.

Thus in accordance with the present disclosure, microscale may be understood to represent a variation in coating thickness of the order of at least hundredths of microns, optionally at least tenths of microns, optionally at least a micron. The shape configuration may comprise a variation in thickness of at least 10%. The distance over which the thickness varies may be 10 microns to 1 mm.

In embodiments, the part to be coated comprises one or more cleaved ends of optical fibres, and wherein the flow control screen surrounds the stripped ends of the fibres so as to form a domed polymer conformal coating structure at the cleaved ends.

In embodiments, the part to be coated comprises one or more optical fibres arranged in a bundle, and wherein the flow control screen comprises a layer of photosensitive polymer material applied to the end of the fibre bundle, the method further comprising transmitting light through the fibre bundle to selectively cure the flow control screen layer at the fibre ends, removing the uncured flow control screen material, and coating the flow control screened fibre ends with the polymeric conformal coating, to thereby produce a convex microlens structure around the flow control screen material.

In embodiments, the method further comprises evacuating the deposition chamber such that the internal pressure of the chamber is less than 20 Pa during deposition.

In embodiments, the deposition chamber is substantially at the ambient temperature.

In embodiments, the support is or is placed on a turntable in the deposition chamber.

Viewed from another aspect, the present disclosure provides a method for forming a vapour deposited polymeric conformal coating on a surface of a part, comprising; placing the part and a flow control screen in a deposition chamber; dispersing a gas into the chamber from which the polymeric coating is deposited on the surface and deposited over the flow control screen; wherein the flow control screen is patterned so as to impose a non-planar topology on the deposited coating.

The part may comprise a plurality of optical fibres, and the surface may comprise a cleaved surface of a fibre core of each of the plurality of fibre cores.

The method may comprise forming the flow control screen on the surface. Forming the flow control screen may comprise applying photosensitive resist to the surface, exposing the resist and developing the resist. Exposing the resist may comprise illuminating the resist with light through the optical fibres. Developing the resist may comprise removing regions of the resist that have not been exposed.

The non-planar topology of the deposited planar coating may comprise domed features on each fibre core. Each domed feature may form a lens with a convex surface, centred on each fibre core. Each domed feature may comprise a Fabry Perot interferometer. The polymeric coating may comprise an optical cavity of the Fabry Perot interferometer.

Viewed from another aspect, the present disclosure provides apparatus for forming a vapour deposited polymeric conformal coating on a surface of a part to provide a polymeric coating layer. The apparatus comprises: a deposition chamber for receiving the part; and a flow control screen in the deposition chamber; one or more chamber inlet configured to disperse a gas into the chamber from which a polymer coating is deposited on the surface; and the flow control screen is spaced apart from the surface and is configured to control a localised flow of the gas in the chamber so as to impose a structure on the deposited coating.

Viewed from another aspect, the present disclosure provides a coated part formed by a process in accordance with aspects of the present disclosure.

In embodiments, the coated part comprises a Fabry-Perot interferometer, and wherein the polymeric coating provides the interferometric cavity of the Fabry-Perot interferometer.

In embodiments, the polymeric coating layer on the surface is formed to have an array of plano-convex structures. The coated part may provide an array of localised Fabry Perot interferometric structures, with each plano-convex structure providing an optical cavity of a localised Fabry Perot interferometric structure.

In embodiments, the coated part comprises one or more cleaved optical fibres or an optical fibre bundle, and wherein the polymeric coating layer forms a domed microlens structure at an end of the optical fibre. In embodiments, the polymeric coating layer forms an array of plano-concave sensors at an end of the optical fibre.

In embodiments, the polymeric coating layer on a coated surface of the part provides one or more microlens structures, optionally concave or convex.

Viewed from another aspect, the present disclosure provides apparatus for performing acoustic sensing. The apparatus comprises: a sensor head having a Fabry Perot interferometer comprising a coated part according to an aspect of the invention, the coated part providing an acoustically sensitive surface arranged as a reflective surface of the Fabry Perot interferometer cavity, and the polymeric coating layer providing the cavity of the Fabry Perot interferometer; wherein an acoustic field incident upon the acoustically sensitive surface modulates the optical path length in the cavity. Reflective surfaces may be formed on the part on either side of the polymeric conformal coating layer to form the Fabry Perot interferometer.

The polymeric conformal coating layer is preferably formed by a process in accordance with aspects of the present disclosure.

In this way, an optical ultrasound imaging apparatus can be provided with a relatively straightforward, effective and fast readout.

In embodiments, the polymeric coating layer on a coated surface is formed to have an array of plano-convex structures, and wherein the coated part provides an array of localised Fabry Perot interferometric structures, with each plano-convex structure providing an optical cavity of a localised Fabry Perot interferometric structure.

The apparatus may further comprise a light source, optionally wavelength tuneable, for generating one or more interrogation beams of electromagnetic radiation. The apparatus may further comprise controllable beam directing means operable to direct the one or more interrogation beams onto addressable locations (x,y) across said acoustically sensitive surface. The apparatus may further comprise: phase control means for controlling the phase difference between the optical fields reflected from the two mirrors of the Fabry Perot Interferometer, such as by tuning the wavelength of light or by controlling the cavity thickness, to thereby adjust the sensitivity of the apparatus. The apparatus may further comprise detection means configured to receive and determine one or more values representative of the power of the reflected one or more interrogation beams from the addressable locations (x,y). The apparatus may further comprise a controller configured to in use operate one or more of the light source, beam directing means, phase control means, and detection means to: interrogate addressable locations (x, y) of the sensor head at a phase difference of the reflected light fields in the cavity at which the reflected light is sensitive to the incident acoustic field; and receive, from detection means, values representative of the power of the reflected interrogation beam for each interrogated addressable location of the region; and form an image indicative of the signal modulated on the reflected one or more interrogation beams by the acoustic field incident on the acoustically sensitive surface at addressable locations (x, y) across the sensitive surface.

BRIEF DESCRIPTION OF THE DRAWINGS

Certain preferred embodiments of aspects of the disclosure will now be described, by way of example only, and with reference to the accompanying drawings, in which.

DESCRIPTION OF THE EMBODIMENTS

Figure 4:
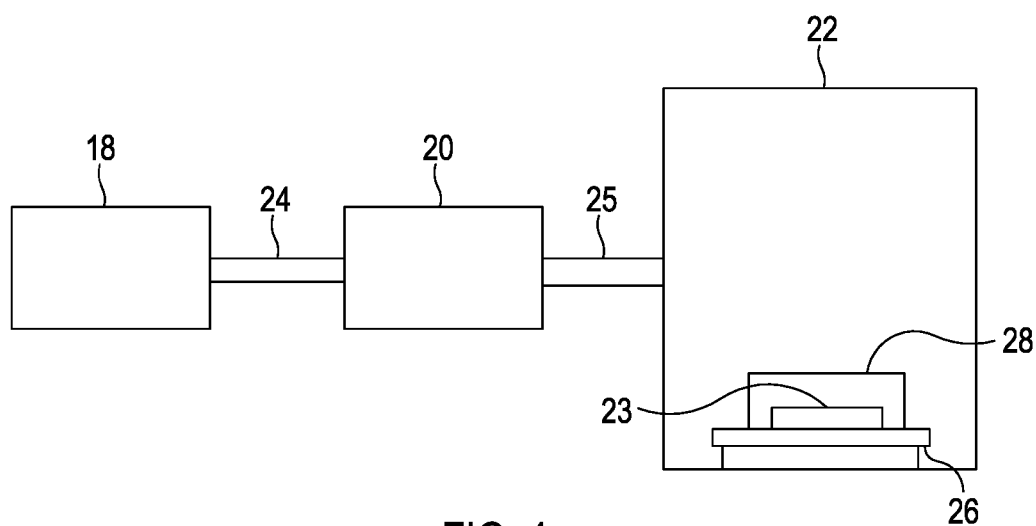
FIG. 4 shows an apparatus for forming a Chemically Vapour Deposited polymeric conformal coating on one or more coating surfaces of a part to be coated for use in embodiments of aspects of the disclosure.

An apparatus and method for forming a Chemically Vapour Deposited polymeric conformal coating on a coating surface (or surfaces) of a part will now be described with reference to FIG. 4. The apparatus and method can be used to form polymeric conformal coatings having a desired structure or thickness variation for use as polymer film interferometers, microlenses, and other structures. While the following description relates to coating with a Parylene, it is to be understood that this is not limiting, any monomer that condenses and forms polymer chains to grow a conformal may be used in embodiments.

The apparatus has an inlet chamber 18, a pyrolysis chamber 20 and a deposition chamber 22 connected by hermetically sealed tubing 24. The pyrolysis chamber 20 is connected to the chamber 22 by a pipe 25, which terminates in the chamber with one or more nozzles, from which monomer particles are dispersed into the chamber 22. A part 23 to be coated, which may be a backing stub for a Fabry Perot interferometer having a thin film dichroic mirror already deposited thereon, or a cleaved optical fibre, or any other part for coating, is introduced to the deposition chamber 22. The part 23 may be supported on a support 26 of the deposition chamber, which may include or itself be supported by a turntable or tumbler mechanism to rotate the part during coating and encourage circulation of and within the monomer gas. The dispersion or flow of monomers from the one or more nozzles may be substantially transverse to the surface to be coated. As will be described further below, to enable scaling and mass production of coated parts, the support 26 may include a tower or other multi-layered or multi-surfaced structure on which multiple parts can be placed, or temporarily adhered (for example, if upside down) such that they can all be coated.

Areas of the part 23 that are to remain free of coating may be covered, for example with a simple adhesive covering tape, since the active parylene monomer will polymerise on any available surface. The surface covering tape will mask covered regions of a surface of the part to prevent deposition. Such a surface covering will be in contact with the surface, and will tend to be very thin, and will consequently not control a localised flow of the dispersed monomer particles in the deposition chamber to impose a structure on the deposited coating. It is important that the part 23 is clean and surface contaminants such as oils and ions are removed prior to the coating process. Conventional solvents may be used to perform the cleaning process. Prior to the coating process, a multi-molecular layer of an organo-silane may also be applied to pretreat the parts of the optical fibre that are to be coated. This functions as an adhesion promoter, allowing the polymers to be applied to virtually any vacuum stable material.

In use, in a first step, a precursor of the polymer coating, in this case a dimer parylene, is introduced into inlet chamber 18 via tubing where in embodiments it is vaporised at approximately 150 C and in a 100 Pa vacuum.

In a second step, the vaporised dimer continues via tubing 24 to the pyrolysis chamber 20 where in embodiments it is heated to a temperature of approximately 680 C in a 50 Pa vacuum. This forms a monomer gas for deposition onto the part 23.

In a third step, the highly active monomer gas, in this embodiment of parylene, continues via tubing 25 to the deposition chamber 22. The deposition chamber is typically at ambient room temperature and at a weak vacuum pressure, for example having an internal pressure of around 10 Pa. The part 23 is placed in the deposition chamber 22 with an exposed surface onto which the parylene monomer can polymerise.

The monomer simultaneously condenses, adsorbs and polymerises on all available surfaces to produce a high molecular-weight polymer coating. In particular, the polymer deposition process does not entrap air since the process is carried out in an effective vacuum. The part 23 is then removed and the coating thickness can be checked.

Due to the chemical properties of the coating material and the polymerisation mechanism, the coating formed is conformal and the coating growth rate is nominally uniform throughout the chamber.

For example there are three common forms of the parylene polymer, parylene C, parylene N and parylene D. The polymers each have high hydrophobicity and as such are particularly useful as sensors for medical probe applications. Typically, the parylene coating grows at a nominal rate of approximately 0.21 µm per minute for parylene C and a slower rate for parylene N.

To achieve fine control over the deposition and polymer growth process to form a polymer coating having a desired shape configuration on microscale dimension, a flow control screen 28 may be placed in the deposition chamber 22 spaced apart from a surface of the part 23 to be coated. The arrangement of the flow control screen 28, spaced apart from the surface to be coated, imposes a structure on the polymeric coating deposited on the surface.

By configuring and arranging the flow control screen, structured polymer conformal coatings can be obtained, which may be shaped as desired to perform a particular function. For example, a Fabry Perot polymer film interferometer can be formed having an array of plano-convex structures to improve reflected signal intensity. Further, concave and convex microlenses can be formed on a flat substrate in a polymer conformal coating process. Further still, microlenses may be formed on the ends of cleaved optical fibres or fibre optic bundles.

The particular configuration and arrangement of flow control screen needed to form a coating layer on a particular part with particular shape configuration can be devised by empirical methods such as by iterative trial and error, or by semi-empirical or theoretical methods such as by appropriate modelling for example of localised flow of dispersed gas around a model of the deposition regulation components in relation to the part, using suitable software. As such, the devising of the configuration and arrangement of the flow control screen (or screens) may be performed based on the teaching of the present disclosure.

A number of non-limiting examples, and their applications will now be described with reference to the drawings.

Figure 1:
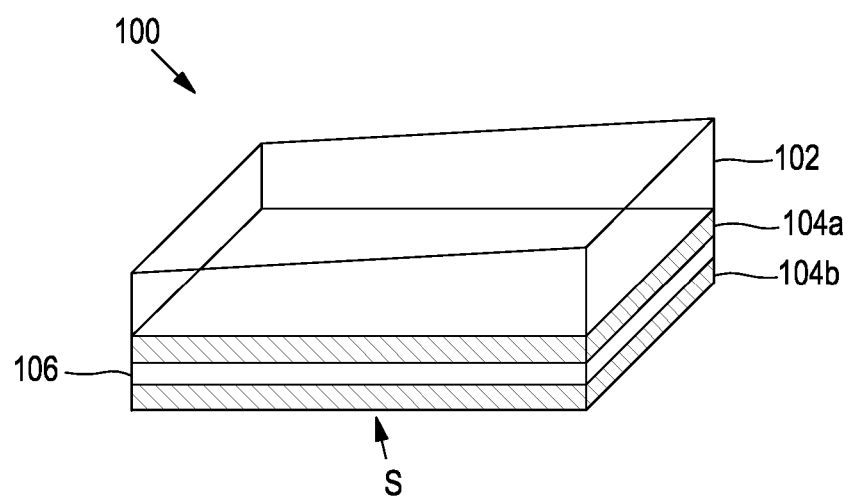
FIG. 1 is a perspective view of a planar Fabry Perot etalon provided in a sensor head in accordance with embodiments of the disclosure.
Figure 2:
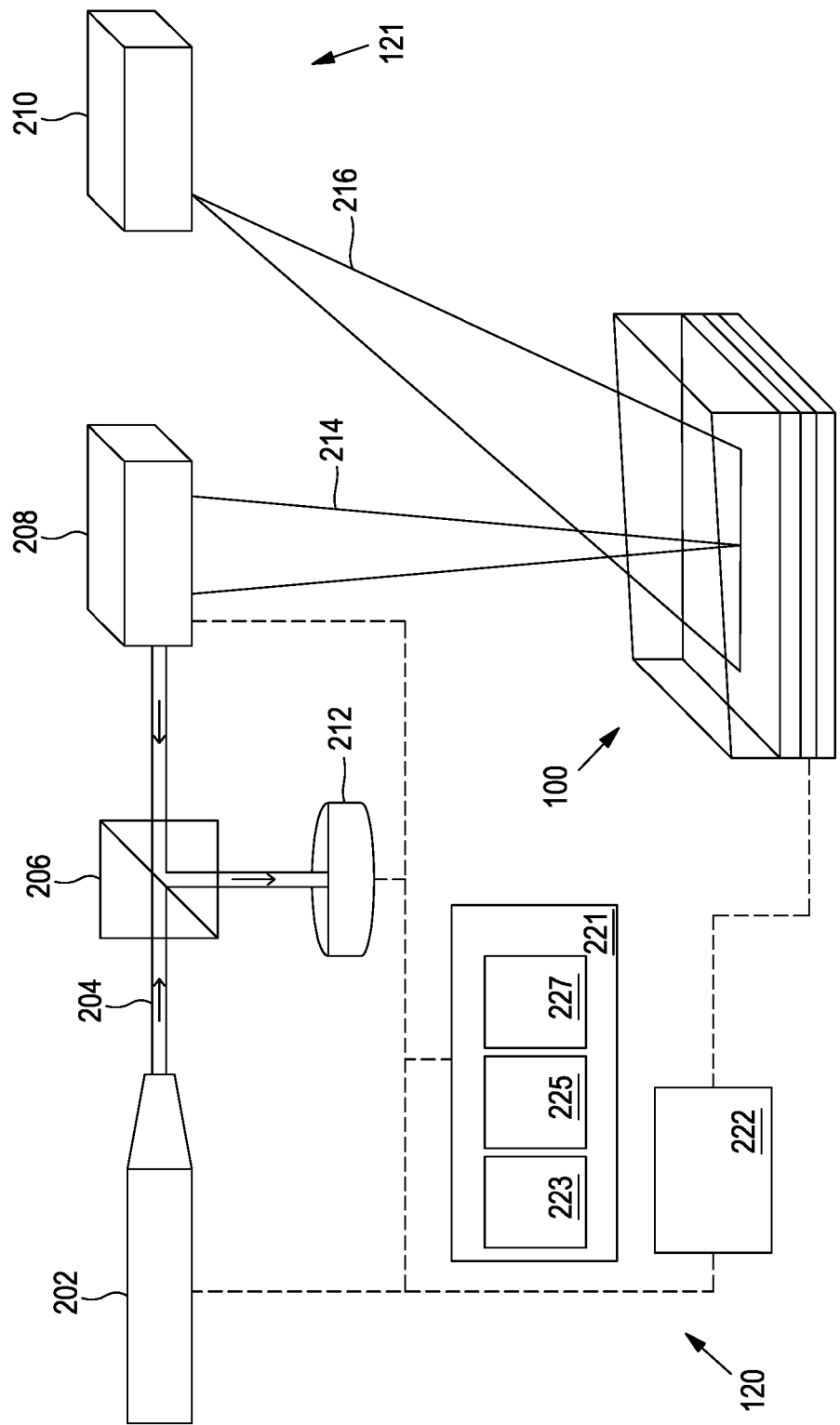
FIG. 2 is a schematic illustration of an apparatus for performing an optical ultrasound imaging in accordance with embodiments of aspects of the disclosure.

FIG. 1 illustrates in a planar Fabry Perot etalon for use in providing a sensor head 100 of an optical ultrasound readout apparatus used in, for example, a photoacoustic tomography apparatus shown in FIG. 2, the operation of which is described below.

The Fabry Perot etalon represents the sensor head 100 or at least the sensing element thereof. The sensor head 100 comprises a wedged transparent polymer backing stub 102 on to which a multilayer sensing structure of the Fabry Perot etalon is vacuum deposited. This includes a spacer 106, typically formed of Parylene polymer film 10-50 μm thick, depending upon the acoustic bandwidth required, sandwiched between two highly reflective mirrors 104a, 104b typically provided by dichroic dielectric thin film mirrors. The cavity spacer layer 106 may be formed by chemical vapour deposition (CVD) whereas the mirrors 104a, 104b may be formed by sputtering. In the example of the photoacoustic tomography apparatus shown in FIG. 2, the mirrors 104a, 104b, are designed to be highly reflective (i.e. reflects at least 95% of power) in a first wavelength range thus forming with the spacer 104 a high finesse Fabry Perot cavity in this wavelength range but highly transmissive in a second wavelength range. Preferably the first wavelength range is between 1500-1700 nm and the second wavelength range is 600 nm-1200 nm.

An embodiment of an apparatus for optical ultrasound readout incorporating a planar Fabry Perot polymer coating interferometer formed in accordance with the present disclosure will now be described with reference to FIG. 2, for use in photoacoustic tomography.

In embodiments, apparatus 200 for performing photoacoustic tomography with respect to a sample (not shown) that receives a pulse of excitation electromagnetic radiation and generates an acoustic field in response to said pulse, comprises generally, a sensor head 100, an excitation light source 121 and an interrogation assembly 120.

The excitation light source 121 is arranged to provide through the sensor head 100 an excitation light beam 216 to be absorbed by a tissue sample and to generate a photoacoustic signal field in the tissue to be detected using the sensor head 100 and interrogation assembly 120. The stimulus of the acoustic (ultrasound) field for readout by the sensor head 100 and interrogation assembly 120 can be any suitable stimulus, such as a piezo transducer or a MEMS device, and is not limited to being generated by a pulsed laser using the photoacoustic effect. Further, while the embodiment describes sensing an acoustic field in a tissue sample, this also is not limiting, and the optical ultrasound readout technique, in this embodiment implemented by the sensor head 100 and interrogation assembly 120, may be applied to sense acoustic fields in a range of media and for a range of different applications, such as for non-destructive testing.

The excitation light source 121 may provide a pulsed light output. The excitation light source 121 may be provided by at least an Optical Parametric Oscillator (OPO) driven by an appropriate source of coherent light, such as an Nd:YAG pulsed laser. In this way, the OPO can be used to change the excitation wavelength of the excitation light source 121 to different wavelengths that are selectively absorbed by the tissue structure, such that different structural and functional features of the tissue can be studied using the apparatus 200.

In the planar Fabry Perot etalon for use in the sensor head 100, the mirrors 104a, 104b, are designed to be highly reflective (i.e. reflecting at least 95% of power) in a first wavelength range thus forming with the spacer 104 a high finesse Fabry Perot cavity in this wavelength range but highly transmissive in a second wavelength range. Preferably the first wavelength range is between 1500-1700 nm and the second wavelength range is 600 nm-1200 nm.

In use, the sensor head 100 is placed such that a sensing surface thereof S is faced against and acoustically coupled to the tissue sample to be imaged (not shown). The sample may include or be covered or coated in a couplant such as a coupling gel, which may be used to ensure the acoustic field is conveyed from the body of the sample (in this case, tissue) to the surface S.

The second wavelength range enables excitation laser pulses from the excitation light source 121 in the near infrared (NIR) window, where biological tissues are relatively transparent, to be transmitted through the sensor head 100 into the tissue. The photoacoustic signals generated by the absorption of the laser energy propagate back to the surface S where they modulate the optical thickness of the spacer 106 and thus the reflectivity of the Fabry Perot sensing structure in the 1500-1700 nm wavelength.

The Fabry Perot etalon of the sensor head 100, having a high finesse, is selectively reflective having a narrowband reflection spectrum, as characterised by the Interferometer Transfer Function ITF of locations of the sensor head, which relates the power of the light reflected by the Fabry Perot etalon across different wavelengths in the free spectral range of the cavity, at a given location on the etalon.

The central phase point $\varphi_0$ or central wavelength $\lambda_0$ of the Interferometer Transfer Function at locations across the sensor head is dependent at least in part on the optical path length of light in the cavity, as defined by the thickness of the spacer 106 at those locations. The acoustic signals from the tissue incident on the sensing surface S of the sensor head 100 modulate the optical path length of the cavity of the Fabry Perot etalon at different locations across its surface by acoustic modulation of at least the thickness of the spacer 106. This in turn modulates the central phase point $\varphi_0$ and central wavelength $\lambda_0$ of the etalon ITF in dependence on the acoustic field incident at that location. Thus, for a single wavelength of light of the ITF, particularly where the ITF slope is high, the reflected power of light of that wavelength is also modulated as the ITF is moved back and forth in wavelength space by the acoustic modulation of the spacer 106. In order to achieve a consistent and desired maximum sensitivity of the reflected power $P_r$ to modulation by $dP_r$ by the acoustic field, the phase difference between the optical fields in the cavity reflected by the two mirrors of the Fabry Perot Interferometer may be biased accordingly by a bias phase $\varphi_b$. In embodiments this is selected to be the phase at which the magnitude of $dP_r$ is maximised and at which the response is most linear (typically where the value $\varphi$ where the of the derivative of the ITF is at a maximum). As will be described below, the biasing of the phase difference can be achieved by operating the phase biasing means 222 to tune the interrogation light source 202 to a bias wavelength $\lambda_b$ at which the phase difference between the optical fields in the cavity reflected by the two mirrors of the Fabry Perot Interferometer is at the bias phase $\varphi_b$. As the variation of the thickness of the Parylene cavity 106 is very small (less than 1-2% across the sensing surface S) due to the manufacture method described herein, the bias phase or bias wavelength inherently only needs to be controlled for or changed only very little across the surface during readout.

Referring again to FIG. 2, the interrogation assembly 120 is arranged to optically interrogate the sensor head at locations across the sensor head to reveal the modulation of the reflected power at that location, to enable an image of the photoacoustic field to be reconstructed using tomographic techniques.

In embodiments, the interrogation assembly 120 may comprise a tuneable coherent interrogation light source 202, beam directing means 208, a detection means 212, a controller 221 and a phase biasing means 222. The controller 221 is coupled to the interrogation light source 202, beam directing means 208, detection means 212 and phase biasing means to provide control signals thereto, and to receive detection signals therefrom and is configured to control the interrogation assembly 120 to carry out the methods for performing photoacoustic tomography disclosed in the present application.

The interrogation light source 202 is arranged to provide a focussed beam of light 204 to beam directing means 208 which redirects the light to move a scanning beam 214 across the surface the Fabry Perot etalon of the sensor head 100. The interrogation light source 202 is configured to be tuneable by the phase biasing means 222 responsive to control by the controller 221 to tune the wavelength of the light 204 to a bias wavelength $\lambda_b$ at which a bias phase $\varphi_b$ of light in the cavity is obtained. The Fabry Perot etalon of the sensor head 100 is designed and the interrogation light source 202 is selected such that the interrogation light source 102 is tuneable by the phase biasing means 222 across the free spectral range of the Fabry Perot etalon. While in the embodiment, the phase of the light in the cavity is tuned to a bias phase by the phase biasing means 222 tuning the wavelength of light of the interrogation light source 202, in other embodiments the phase difference between the optical fields in the cavity reflected by the two mirrors of the Fabry Perot Interferometer may be controlled to achieve a desired phase bias by the phase biasing means 222 adjusting the phase by other means, such as by adjusting one or more of the wavelength of light, the optical path length of light in the cavity and the refractive index of the cavity, by appropriate means.

In embodiments, the interrogation light source 202 may be a tuneable laser emitting coherent light with a wavelength in a range around 1550 nm. The interrogation light source 202 is coupled to controller 221 and is configured to be tuned thereby to transmit light at a wavelength based on a control signal sent from the controller 221.

The beam directing means 208 is configured to redirect the focused beam 204 onto the Fabry Perot etalon of the sensor head 100 to point the scanning beam 214 to be incident on the Fabry Perot etalon at any one of a plurality of addressable locations across the plane of the Fabry Perot etalon, which may be specified or represented as values x and y of the x and y axes of a set of planar coordinates on the etalon. The beam directing means 208 is configured to steer the scanning beam 214 to a given addressable location (x,y) based on a control input received from controller 220. The addressable locations (x,y) of the interrogation assembly 120 may be specified by step-wise increments of the redirection angles in x and y achievable by the beam directing means, and/or by increments or control values specified by the controller 220. The redirection of the focussed beam 204 may be achieved in the beam directing means by one or more steering mirrors, lenses, microlenses or other appropriate optical components attached to one or more micromechanical control devices, servos, MEMS controllers or galvanometers.

The detection means 212 is arranged to sense the power of the light reflected from the sensor head and to provide a signal indicating the measured reflected power to the controller 221. The interrogation assembly 120 may comprise a beam splitter 206, and/or one or other appropriate optical components which may be arranged to focus the light beam onto the sensor head 100 and to redirect light reflected from the sensor head 100 onto the detection means 212. The detection means 212 may be any component configured to absorb incident light in the tuneable range of the interrogation light source and provide a signal output indicative of the power of the incident light. In embodiments, the detection means 212 may be a photodetector, an active pixel sensor, a charged coupled device, or a bolometer, for example.

The controller 221 may comprise a computer readable medium, which may be a random access memory (RAM) such as one or more volatile or non-volatile memory solid state memory units, such as flash memory. The controller 221 may also comprise one or more data processors.

The computer readable medium of the controller 221 stores scanning wavelength data 223. The scanning wavelength data 223 may be stored as a data array or a look up table or in any other suitable form.

The controller 221 also comprises an interrogation control module 225 and a sensor tuning module 227. The interrogation control module 225 and sensor tuning module 227 may be provided by one or more logical components implemented by one or more data processors of the controller 221 in use.

The controller 221 may comprise one or more data processors pre-configured to provide one or more of the said logical components. For example, one or more of the processors may be dedicated microcontroller or Field Programmable Gate Array-based components specifically designed to carry out certain steps of the methods described herein. In embodiments, the one or more data processors may comprise an FPGA, a microcontroller of a dedicated design, or any other appropriately configured data processing means of implementing the interrogation control module 225 and carrying out the sensor interrogation methods described herein. In embodiments, the one or more data processors may also comprise an FPGA, a microcontroller of a dedicated design, or any other appropriately configured data processing means of implementing the sensor tuning module 227 and carrying out the sensor tuning methods described herein.

Alternatively, or in addition, the controller 221 may comprise one or more data processors configured only in use to provide one or more of the said logical components. For example, one or more of the processors may be a general-purpose processor (e.g. a Central Processing Unit) coupled to a memory comprising instructions for configuring the processor to carry out certain steps of the methods described herein. In embodiments, the computer readable medium of the controller 221 that stores the scanning wavelength data 223 may also store instructions which when executed by one or more data processors, cause one or more of the data processors to implement the interrogation control module 225 and carry out the sensor interrogation methods described herein. In embodiments, the computer readable medium of the controller 221 may also store instructions which when executed by one or more data processors, cause one or more of the data processors to implement the sensor tuning module 227 and carry out the sensor tuning methods described herein.

The scanning wavelength data 223 is representative of a set of wavelength values of the wavelength tuneable source 202 for addressable locations (x,y) of the sensor head 100. Specifically, the scanning wavelength data 223 may relate:
- addressable locations (x,y) of the sensor head onto which the one or more interrogation beams can be directed in use; and
- a respective determined bias wavelength, $\lambda_b$, for the wavelength source at given addressable locations (x,y), selected to be a tuned wavelength of the source at which the power of the interrogation beam interferometrically reflected from the Fabry Perot cavity is in use modulated by the signal from the acoustic field incident on the acoustically sensitive surface at that location.

The scanning wavelength data 223 can be stored in any appropriate way for controlling the phase difference between the optical fields in the cavity reflected by the two mirrors of the Fabry Perot Interferometer during readout. For example, the data 223 can be stored in a database as tuples each relating a given addressable location (x,y) to the determined bias wavelength $\lambda_b$ for that addressable location, or as a bitmap or as a lookup table (LUT).

The scanning wavelength data 223 is used by the controller 221 to control the beam directing 208 means to direct the interrogation beam to a current addressable location (x,y) of the sensor head and to simultaneously control the phase biasing means 222 to tune the tuneable wavelength interrogation light source 202 to a bias wavelength $\lambda_b$ stored therein to achieve the desired bias phase $\varphi_b$ of light in the optical cavity for the current addressable location (x,y) of the sensor head 100. The controller may perform readout of the addressable locations (x,y) of the sensor head in an appropriate manner, such as by raster scanning. The scanning wavelength data 223 is simultaneously used by the controller 221 to coordinate the received power signal from the detection means 212 with the addressable location being interrogated.

To generate the tuning map embodied by scanning wavelength data 223 used to tune the phase or wavelength bias during readout, the phase or wavelength bias across the addressable locations (x,y) of the sensor head may be determined in a pre-readout calibration step. This may be performed by operating the phase biasing means 222 to tune the phase (or wavelength) bias across the Free Spectral Range of the interferometer to generate a phase (or wavelength) ITF at each addressable location, and by identifying the phase or wavelength at which the derivative of each ITF is at a maximum as the bias phase or wavelength. Alternatively, instead of tuning the phase of the light in the cavity based on a pre-tuning map, the bias phase could be tracked and tuned on the fly and in real time using an iterative tracking method with, for example, a very fast tuning laser.

Figure 3A:
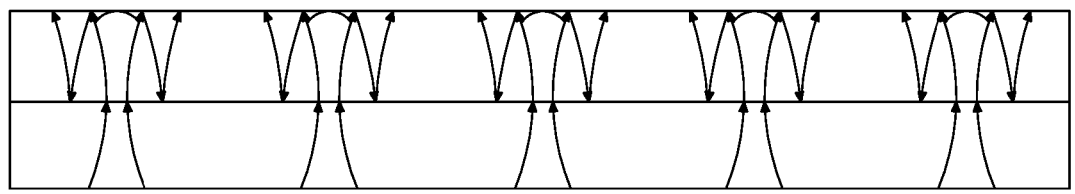
FIG. 3A is a sectional view of a planar Fabry Perot etalon in accordance with embodiments of the disclosure.
Figure 3B:
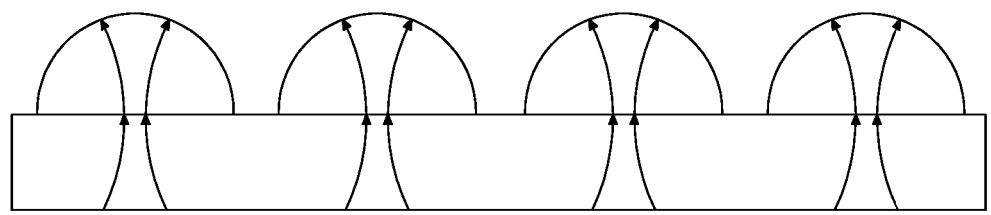
FIG. 3B is a sectional view of a Fabry Perot interferometric cavity with plano-concave geometry in accordance with embodiments of the disclosure.

While the above describes the use of a Fabry Perot polymer film interferometer having a cavity with a substantially constant thickness for an optical ultrasound readout, a sensor head having addressable locations corresponding to plano-convex cavities (as shown in FIG. 3B) offers significantly higher sensitivity and signal response since it avoids beam walk-off (i.e. the beam is contained at the addressable location), thereby allowing many more round trips within the cavity thus increasing its Q-factor.

A polymer film having an array of plano-concave cavities may be formed using a flow control screen in the form of a mesh grid may be positioned spaced apart from and in proximity with the surface of the part to be coated in order to superimpose the mesh structure onto the shape configuration of the polymer coating on microscale dimensions. The mesh grid may be spaced from the surface by at most 4 mm, optionally at most 3 mm, optionally at most 2 mm, optionally at most 1 mm. This is the case for a mesh grid having a hole size of around 1.2 mm in diameter.

In general, a flow control screen may be placed adjacent a coating surface of the part to be coated and configured to control a localised flow of the dispersed monomer gas in the chamber so as to impose a structure on the shape configuration of the deposited coating. The flow control screen may be provided on, around or closely facing, a coating surface of the part to be coated to control the polymeric deposition. The separation distance between the flow control screen and the coating surface may be less than 3 times size of the individual features in the flow control screen or mesh grid. For example, if the flow control screen is an array of circular holes each of diameter d, then the flow control screen may be placed at a distance from the coating surface of no more than 3d in order for the features to be imposed in the shape configuration of the coating layer on microscale dimensions. This is an empirically based rule of thumb and depends on a number of parameters. The flow control screen may be provided contacting the surface of the part to be coated, or it may be spaced apart from the surface of the part to be coated. It is not provided merely to cover and prevent deposition on areas of the surface to be coated (indeed, when spaced apart from the surface, a coating layer may still be deposited on the surface underneath the flow control screen), but rather it is provided to control the flow of dispersed monomer gas around the surface of the part to be coated so as to promote the growth of the coating to have a desired shape configuration, such as to grow specific surface features.

The flow control screen may not simply be patterned with openings and surrounding shapes to control the flow of the dispersed monomer gas, other shape features such as concave or convex ridges, protrusions or domes, may be provided to control the flow to promote or penalise deposition locally to produce a desired shape configuration in the deposited coating layer.

Figure 5A:
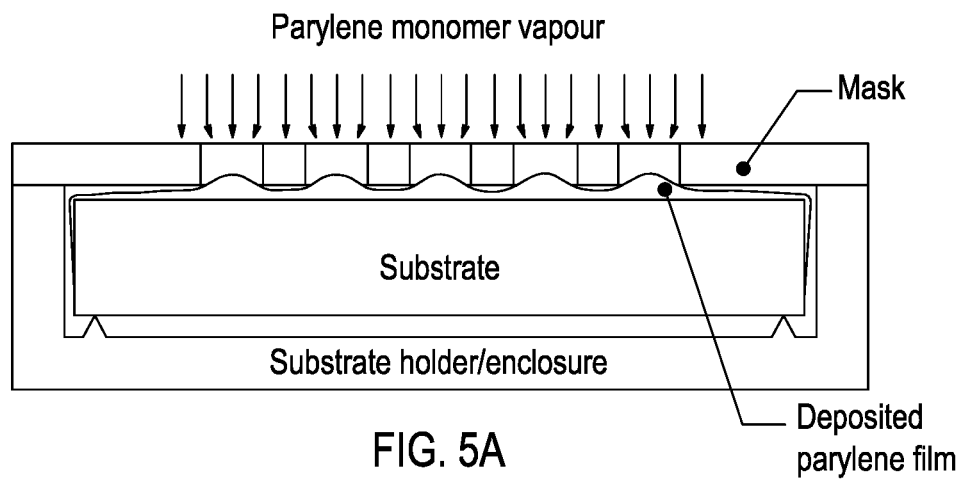
FIG. 5A shows an arrangement of a flow control screen to produce an array of plano-convex microlens microstructures for use, for example, in a polymer film interferometer in accordance with an embodiment of aspects of the disclosure.

Referring now to FIG. 5A, a flow control screen is shown that may be used to create an array of plano-convex structures for use in a Fabry Perot polymer film interferometer cavity, or otherwise for providing a polymer coating having a desired shape configuration on microscale dimensions to provide a series of microlenses.

Figure 5B:
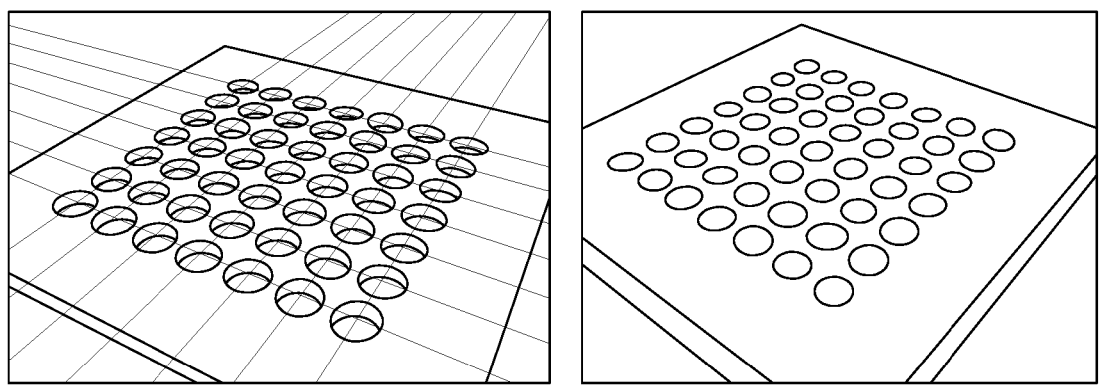
FIG. 5B shows the flow control screen and finished micolens array of FIG. 6A.

In this embodiment, the part to be coated, in this case a substrate, is placed in the deposition chamber 22 in an arrangement of deposition regulation components in this case including a substrate holder/enclosure that is closed with a flow control screen arranged to be spaced apart from the surface of the part to be coated by a spacing of around 1-2 mm or less (or less than three times the diameter or size of the features, or the smallest feature to be imposed on the deposited coating layer). In some embodiments, the spacing between the flow control screen and the substrate may be 50 microns to 500 microns. The flow control screen, shown in more detail in the left panel of FIG. 5B, has a series of openings. The openings are configured to control the flow of the monomer gas particles around the coating surface of the substrate such that the polymer coating forms a series of convex microlenses on the substrate, shown in more detail in the right panel of FIG. 5B. The convex microlenses could provide an array of plano-convex structures, for example for use as Fabry Perot interferometer sensor elements.

In some embodiments the flow control screen may be fabricated by electrochemical etching, laser micromachining or deep reactive ion etching. Electrochemical etching, for example, has been found to produce clean edges, which may be advantageous. An opening in a flow control screen may typically comprise a diameter of at least half the thickness of the flow control screen. In some embodiments, the flow control screen may comprise a plurality of pillars (instead of a plurality of holes). In some embodiments the flow control screen may vary in thickness, and/or may be placed at an angle (i.e. not parallel to) to the surface on which the polymeric coating is to be deposited. The variation in thickness of the flow control screen may, for example, vary the aspect ratio of an array of apertures (where the apertures all have the same diameter). In some embodiments the flow control screen may be moved relative to the part to be coated (e.g. by mounting at least one of the part to be coated or the flow control screen on a rotation or a translation stage).

Figure 6:
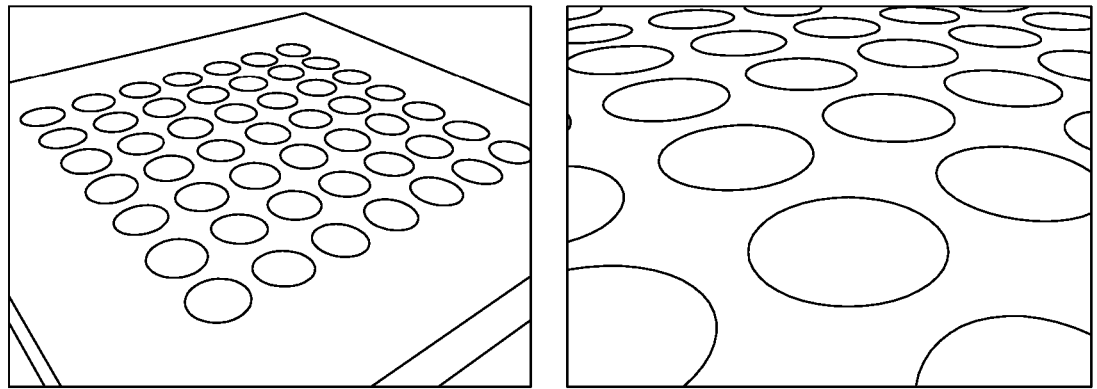
FIG. 6 shows a flow control screen usable to provide a plano-concave microlens array, and a finished polymer coating microlens array in accordance with an embodiment of aspects of the disclosure.

In another embodiment, FIG. 6 shows, in the left panel, a flow control screen usable in place of the flow control screen shown in in the embodiment of FIG. 5A to provide a concave microlens array. A finished polymer coating concave microlens array produced using this flow control screen is shown in the right panel of FIG. 6.

Figure 7:
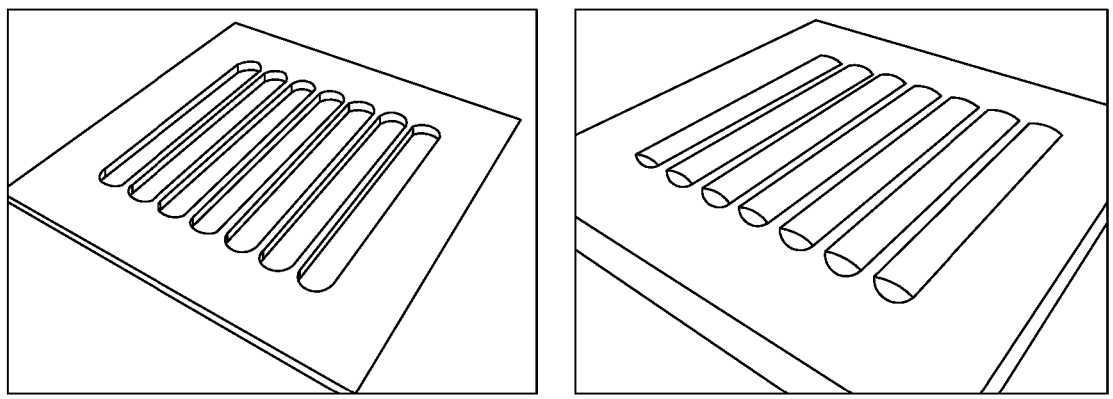
FIG. 7 shows a flow control screen usable to provide a series of plano-convex cylindrical microlens strips, and a finished polymer coating having cylindrical microlens strips in accordance with an embodiment of aspects of the disclosure.

In another embodiment, FIG. 7 shows, in the left panel, a flow control screen usable in place of the flow control screen shown in in the embodiment of FIG. 5A to provide a series of plano-convex cylindrical microlens strips. A finished polymer coating series of plano-convex cylindrical microlens strips produced using this flow control screen is shown in the right panel of FIG. 7.

The shape configuration of these features at microscale dimensions is formed by the flow control screen controlling the flow in such a way as to inhibit the deposition in some regions and promote it at others in order to achieve the desired shape. For example, a circular flow control screen will yield the highest thickness at the centre of the aperture where the flow is relatively unrestricted with reduced thickness at the perimeter and beyond. This can be understood by describing the behaviour of the deposition in terms of mean free path of the monomer gas in response to the features of the flow control screen.

The flow control screen may have a shape and configuration adapted to promote the formation of specific geometrical structures. An understanding of the coating process may facilitate the design of the flow control screen. Parylene is deposited by introducing a gas that disperses widely and coats all exposed surfaces irrespective of the orientation to the gas inflow to the chamber. It should be noted that most vacuum thin film coating processes (e.g. sputtering of dielectric layers or thermal evaporation of metallic coatings) are line-of-sight processes, and so the use of deposition regulation components configured to "control flow" would not work with these processes.

The pattern or structure imposed by the flow control screen may be measurable by an appropriate measuring technique (such as atomic force microscopy). The structure may comprise variations in the thickness of the coating from tenths to hundredths of a micron on a polymer conformal coating having a thickness on the order of microns to tens or even hundreds of microns (e.g. 1 micron to 500 microns)

These sub-micron level patterns can be achieved by arranging a flow control screen facing the coating surface but spaced sufficiently far away from the surface to impose a shape configuration of a coating feature on the coating at a sufficiently low level (e,g, 10% or less of the total thickness). For example, a pattern with a 1% variation in coating thickness may be achieved by locating a patterned flow control screen at a spacing of around three times the size of the features or less. On a one micron thick coating, that gives a nanoscale pattern of a variation in height of 10s of nanometers.

Figure 8:
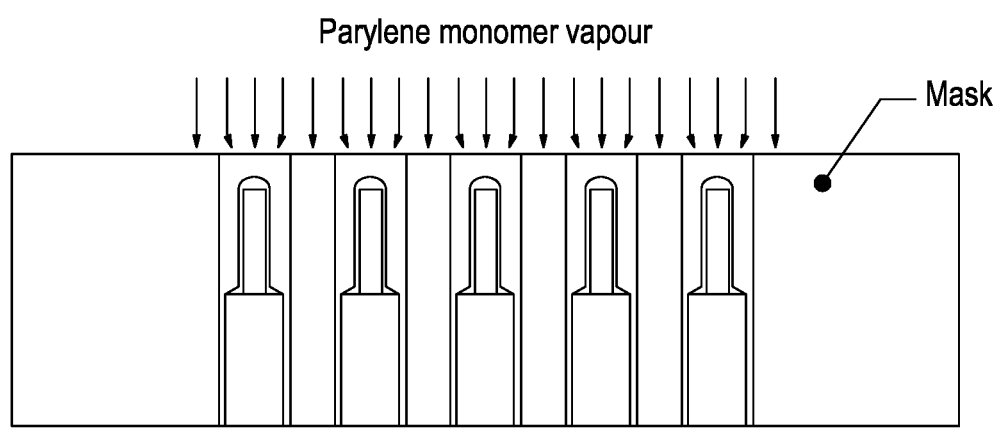
FIG. 8 shows a flow control screen usable to form a domed microlens structure from a polymeric coating at an end of one or more cleaved optical fibres in accordance with an embodiment of aspects of the disclosure.

Referring now to FIG. 8, an flow control screen or mask is that may be used to form a domed microlens structure from a polymeric coating at an end of one or more cleaved optical fibres. In this embodiment, the part to be coated comprises one or more cleaved ends of optical fibres. As shown in FIG. 8, the flow control screen surrounds and is spaced apart from the stripped ends of the fibres so as control the flow of the monomer gas around the stripped ends of the fibre such that the formation of a polymer conformal coating having a desired domed shape configuration to give a microlens structure at the cleaved ends is promoted.

Figure 9:
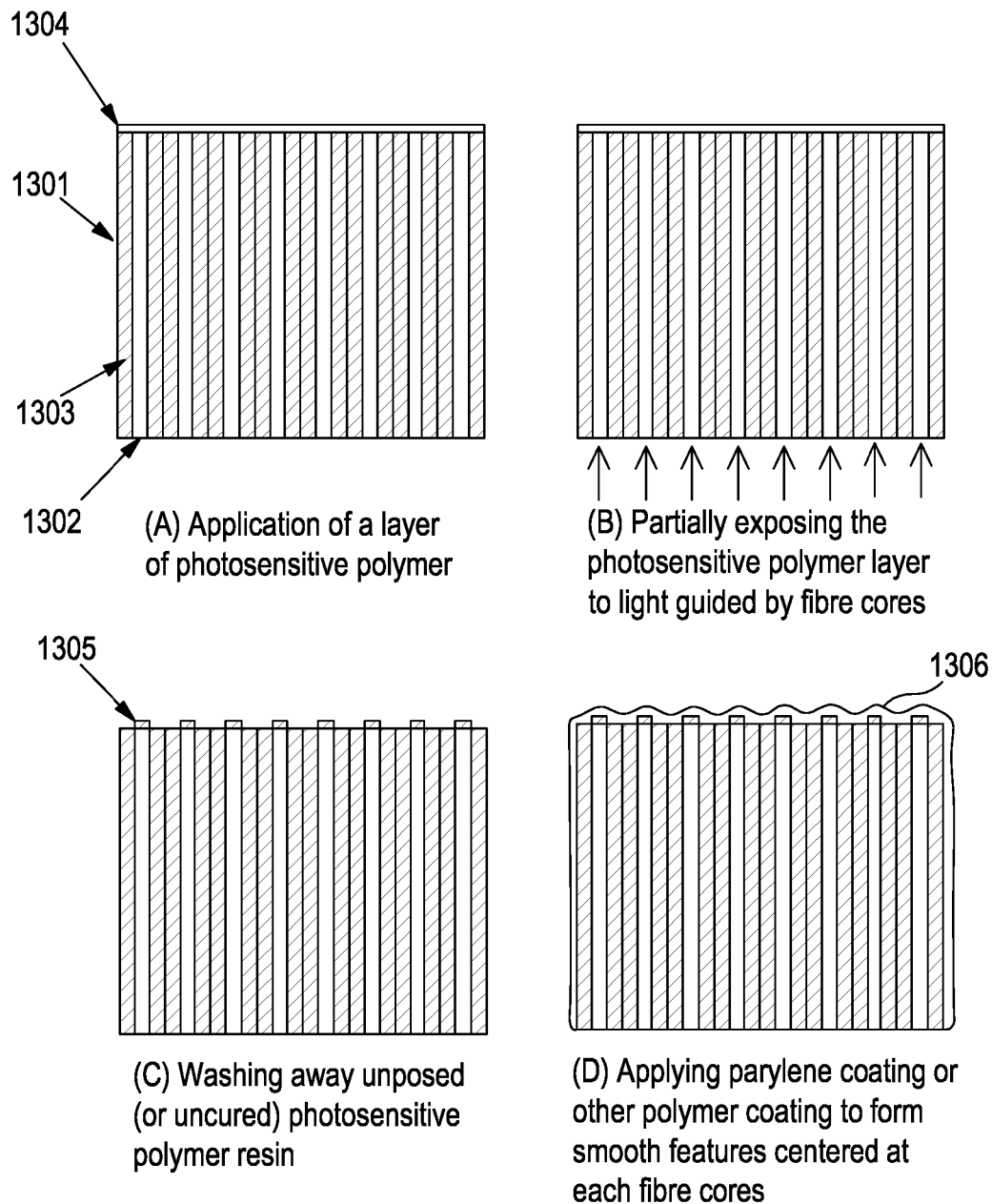
FIG. 9 illustrates a method of forming and using a flow control screen to form domed microlens structures from a polymeric coating at an end of optical fibres in a bundle in accordance with an embodiment of aspects of the disclosure.

Referring now to FIG. 9, an flow control screen 1305 as shown in the bottom left panel of FIG. 9 may be used to form a domed microlens structure 1306 from a polymeric coating at an end of optical fibres in a bundle 1301.

In this embodiment, the part to be coated comprises one or more optical fibres arranged in a bundle 1301. The bundle 1301 comprises a plurality of light guiding cores 1302 covered in fibre cladding 1303 bound together to form the bundle 1301.

To form the flow control screen 1305, in a first step, a layer of photosensitive polymer material 1304 is applied to the end of the fibre bundle (see step (A), top left panel). Then, in a second step, UV light is transmitted through the fibre bundle to selectively cure the layer of photosensitive polymer material 1304 at the fibre ends (see step (B), top right panel). Then, in a third step, the uncured material is removed by etching or otherwise washing it away such that each individual fibre end is flow control screened with a cured polymer resin layer (see step (C), bottom left panel). In this way, a flow control screen 1305 are is formed as a series portions at each fibre end on the bundle. Thereafter, in a fourth step, the flow control screened fibre ends are coated with the polymeric conformal coating, with the flow control screen 1305 promoting the formation of a convex microlens structure around the flow control screen material (see step (D), bottom right panel).

The invention claimed is:

1. A method of forming a Fabry Perot interferometer, the method comprising:
   depositing a first reflective layer (104b) on a part (23), thereby defining a first reflective surface of the part;
   vapour depositing polymeric conformal coating on the first reflective surface of the part, the vapor depositing comprising:
   placing the part and a flow control screen in a deposition chamber;

dispersing a gas into the chamber from which the polymeric coating is deposited on the surface;

wherein the flow control screen is spaced apart from the first reflective surface and is configured to control a localised flow of the dispersed gas in the chamber so as to impose a structure, in the form of a thickness variation, on the deposited coating, wherein the flow control screen comprises openings such that imposing a structure on the deposited coating produces an array of curved elements, wherein the curved elements extend beyond the region defined by the perimeter of the openings of the flow control screen; and depositing a second reflective layer on the polymeric coating to define a second reflective surface in opposition to the first reflective surface, to thereby form the Fabry Perot interferometer with the polymeric coating (106) as the optical cavity of the Fabry Perot interferometer.

2. The method of claim 1, wherein the gas of monomer particles includes a para-xylylene, and wherein the deposited polymer coating is a Parylene.

3. The method of claim 1, wherein the flow control screen comprises a mesh grid.

4. The method of claim 3, wherein the flow control screen is spaced less than 5 mm from the surface, or less than three times the diameter of the mesh hole size from the surface, so as to create a patterning of the thickness of the polymeric coating.

5. The method of claim 3, wherein the patterning of the thickness of the polymeric coating creates an array of plano-convex structures, and wherein the finished part provides an array of localised Fabry Perot interferometric structures, with each plano-convex structure providing an optical cavity of a localised Fabry Perot interferometric structure.

6. The method of claim 1, wherein flow control screen is spaced apart from the surface by at most 2 mm or at most three times the size of a feature of the flow control screen that is to impose structure or pattern on the coating.

7. The method of claim 6, wherein the flow control screen is patterned to produce, in the coating layer deposited on the part, one or more microlens structures.

8. The method of claim 6, wherein the part to be coated comprises one or more cleaved ends of optical fibres, and wherein the flow control screen surrounds the ends of the fibres so as to form a domed polymer conformal coating structure at the cleaved ends.

9. The method of claim 1, further comprising evacuating the deposition chamber such that the monomer particles polymerise on the part to be coated at an internal pressure of the chamber of less than 20 Pa.

10. The method of claim 1, wherein the deposition chamber is at an ambient temperature.

11. The method of claim 1, wherein the support is or is placed on a turntable in the deposition chamber.

* * * * *